(12) United States Patent
Habraken

(10) Patent No.: US 6,575,584 B1
(45) Date of Patent: Jun. 10, 2003

(54) LIGHT GUIDING PLATE WITH INTERNAL MICRO-PRISMS

(75) Inventor: Serge Habraken, Comblain-Au-Pont (BE)

(73) Assignee: Universite De Liege, Liege (BE)

( * ) Notice: Subject to any disclaimer, the term of this patent is extended or adjusted under 35 U.S.C. 154(b) by 0 days.

(21) Appl. No.: 09/550,050

(22) Filed: Apr. 14, 2000

(30) Foreign Application Priority Data

May 28, 1999 (EP) ............................................. 99201727

(51) Int. Cl.[7] ................................ F21V 8/00; F21V 7/04
(52) U.S. Cl. ......................... 362/31; 362/327; 362/330; 362/346
(58) Field of Search .......................... 362/31, 327, 330, 362/339, 346, 259, 551, 553, 561; 349/62, 65

(56) References Cited

U.S. PATENT DOCUMENTS

| | | | | |
|---|---|---|---|---|
| 3,234,376 A | * | 2/1966 | Ceglia | 362/330 |
| 4,432,039 A | * | 2/1984 | Cibie | 362/31 |
| 4,576,436 A | * | 3/1986 | Daniel | 385/25 |
| 4,874,228 A | * | 10/1989 | Aho et al. | 362/561 |
| 5,128,842 A | | 7/1992 | Kenmochi | 362/95 |
| 5,418,631 A | * | 5/1995 | Tedesco | 349/65 |
| 5,485,291 A | | 1/1996 | Qiao et al. | 359/49 |
| 5,485,354 A | | 1/1996 | Ciupke et al. | 362/31 |
| 5,512,219 A | | 4/1996 | Rowland et al. | 264/1.6 |
| 5,648,859 A | | 7/1997 | Hirabayashi et al. | 349/9 |
| 5,649,754 A | | 7/1997 | Matsumoto | 362/31 |
| 5,664,862 A | | 9/1997 | Redmond et al. | 362/31 |
| 5,700,078 A | * | 12/1997 | Fohl et al. | 362/553 |
| 5,729,311 A | * | 3/1998 | Broer et al. | 349/65 |
| 5,764,322 A | * | 6/1998 | Mamiya et al. | 349/65 |
| 5,779,337 A | | 7/1998 | Saito et al. | 362/31 |
| 5,833,517 A | | 11/1998 | Konda et al. | 451/29 |
| 5,947,578 A | * | 9/1999 | Ayres | 362/31 |
| 6,014,192 A | * | 1/2000 | Lehureau et al. | 349/62 |
| 6,069,728 A | * | 5/2000 | Huignard et al. | 349/62 |
| 6,152,570 A | * | 11/2000 | Yokoyama | 362/31 |
| 6,234,639 B1 | * | 5/2001 | Noguchi | 362/31 |

FOREIGN PATENT DOCUMENTS

| | | |
|---|---|---|
| EP | 0 364 228 | 4/1990 |
| EP | 0 597 261 B1 | 5/1994 |
| EP | 0 704 655 A1 | 4/1996 |
| EP | 0 819 884 A1 | 1/1998 |
| EP | 0 885 705 | 12/1998 |
| GB | 2272277 | 10/1992 |
| WO | 94/23244 | 10/1994 |
| WO | 94/24589 | 10/1994 |
| WO | 96/30786 | 10/1996 |
| WO | 97/41471 | 11/1997 |

* cited by examiner

Primary Examiner—Alan Cariaso
(74) Attorney, Agent, or Firm—Jacobson Holman PLLC

(57) ABSTRACT

An illumination device comprising a plate provided for guiding light there through, having an input for receiving an input light beam to be injected into said plate and an array of N micro-prisms for receiving the input light beam and producing an output light beam from the input light beam. The array of micro-prisms is located inside the plate.

13 Claims, 4 Drawing Sheets

LIGHT GUIDING PLATE WITH INTERNAL MICRO-PRISMS

The present invention is related to an illumination device. The present invention is also related to several applications of the use of reflective micro-prisms into specific embodiments.

Illumination devices are known in the art. Illumination devices are based on a light propagation through a plastic plate by total internal reflection (generally referred to as TIR) wherein the light may be extracted from the plate by various systems;

a system based on diffraction gratings;

a system based on micro-diffuser;

a system based on micro-prisms.

The first kind generates a wavelength dependant illumination, which is unwanted for display applications since screen lighting has to be white.

The second kind generates diffuse light without precise control of divergence, which results in an inefficient illumination device.

The third kind is related to the field of the present invention.

More particularly, several documents have described more specific embodiments.

For example, U.S. Pat. No. 5,833,517 is describing a gradation pattern formed by sandblasting of a surface to allow outgoing of light by scattering.

U.S. Pat. No. 5,649,754 is describing a similar plate with outgoing of light based on irregular reflectors regions resulting in scattering of the light out of the plate.

U.S. Pat. No. 5,833,517 and U.S. Pat. No. 5,649,754 are using scattering effects which are random dependant and always generate a high divergence of the output beam.

U.S. Pat. No. 5,485,291, U.S. Pat. No. 5,485,354 and U.S. Pat. No. 5,664,862 are describing a guiding plate wherein light is extracted with micro-prisms. Those prisms are etched at the back-side of the plate. An input light beam is refracted through the prisms and a reflective flat surface is used to reflect back the light through the plate thickness and the front surface, producing an output light beam. Such back travelling of the light compromises light transmission inside the plate and is not efficient to control divergence properties of the output light beam.

U.S. Pat. No. 5,128,842 is describing a thin micro-prism plate wherein each prism formed on the underneath surface, is coated with a fully reflective coating. When light is hitting a prism, it is reflected out of the plate and a high intensity spot of light is generated out of the device. But when light is hitting an interface between 2 prisms, it is reflected under TIR conditions inside the plate and no spot-light is extracted from that location. Light distribution of the output light beam cannot be considered as continuous, especially when distance between prisms is large. In such a case one have a discrete light distribution. No smooth illumination is produced. One may also have divergence of the output light beam. A disadvantage of such plate is coming from a metallic coating at the bottom of the plate. When light, particularly coherent light is hitting the coating, it is reflected and diffraction may occurred at the prisms edges resulting in a disturbed output light beam. A contribution of diffracted light in the output light beam, generates a scattering effect of the light, which is particularly disastrous for a fan-out generator. Output light divergence and intensity distribution are totally out of control.

SUMMARY OF THE INVENTION

It is one of the various objects of the present invention to provide an improved illumination device.

We have now found that the scattering and the divergence effects in the output light beam are significantly reduced when micro-prisms are located inside the illumination device.

It is another object of the present invention to develop a device that allows a uniform illumination for compact and low-cost characteristics.

It is another object of the present invention to develop a low-cost plate generating a fan-out of beams that allows a discrete distribution of the output light beam by beam splitting inside the plate.

According to the present invention, there is provided an illumination device comprising a plate provided for guiding light there through, having an input for receiving an input light beam to be injected into said plate and an array of N micro-prisms provided for receiving the input light beam and producing an output light beam from said input light beam characterised in that the array of N micro-prisms are located inside the plate.

Advantageously, when the micro-prisms are located inside the plate, one has a medium of homogenous refractive index surrounding the micro-prisms.

The input light beam to be injected into the plate of this invention, may be provided from a light source such as an optical fibre or an extended light source such as a tube lamp, a light bulb or a LED (Light Emitting Diode) in order to obtain an uniform output light beam intensity.

The input light beam may also be provided by a light source with low divergence and small section, in order to generate an output fan-out of beams. For example the light source may be an optical fibre with a collimating lens, a laser diode with a collimating lens or a gas laser beam.

Preferably the input light beam is injected into the plate by one edge.

In an illumination device according to the invention, the plate is provided for guiding light. It may be made, for example, of glass, plastic material, rubber material or composite material.

The input light beam is propagating inside the plate by transmission and reflection.

An array of micro-prisms according to the invention is provided for receiving the input light beam and producing an output light beam. Such prisms have an inclined reflecting surface.

When light is hitting a micro-prism on its inclined reflecting surface with an incident angle inferior to 90 degree, it is partly reflected onto the micro-prism. Light may also be transmitted inside the plate by total reflection on the plate sides.

Preferably, when light is hitting a micro-prism on its inclined reflective surface, it is partly reflected and partly transmitted through the prism to the next micro-prism.

Advantageously such illumination device provides a higher degree of control of the illumination outgoing the plate. In particular, uniformity and divergence of the output light beam may be optimised.

Another advantage is that the plate itself remains translucent even with micro-prisms located inside said plate. For example when a light flux is directed towards the plate at its bottom; it penetrates inside the plate wherein it is reflected partly onto micro-prisms and by TIR onto bottom and top surfaces of the plate. Said light flux is still transmitted throughout the top surface of the plate and remains conserved on the other side of the plate as well as it would be conserved throughout a transparent plate. On the other hand, intensity distribution of the light flux is perturbed which means that the plate is acting as a translucent material.

Still another advantage is that the illumination device may be operated under white light illumination. No significant wavelength dependence occurs in the near UV, visible and near IR.

Reflectivity of the device according to the invention may be optimised to obtain a desired divergence and intensity distribution of the output light beam. Reflectivity is depending of the number of prisms aligned in the plate. To get a uniform illumination, reflectivity should be distributed between prisms with a 1/N law, where N is the micro-prism number. For example, in a plate wherein 4 micro-prisms are aligned at equal distance; a uniform output light beam will be obtained when 25% reflectivity is obtained at the first micro-prism close to a light source, 33% reflectivity at the second micro-prism, 50% at the third and 100% at the last one at the end of the plate.

The reflectivity of the device may be varied through the plate as a function of the distance between the light source and each micro-prism, by modifying physical characteristics of said micro-prism or by modifying the micro-prism reflective surface. The physical characteristics of the micro-prisms and the thickness of the reflective surface coating may be varied and optimised to obtain the desired output light divergence and intensity distribution.

The physical characteristics of the micro-prisms are for example shape, angle, length, roughness, spacing and depth of the micro-prism or curvature of micro-prism inclined surface.

The micro-prisms according to the invention may be of any shape such as for example pyramidal, hexagonal or triangular shape. The micro-prisms have preferably a right angle triangle cross section and an angle between inclined and vertical surfaces of 15 to 60 degrees.

The distance between two micro-prisms may be varied between 0.2 to 20 mm but is preferably inferior to 1 mm.

The roughness may be varied from 5 to 50 nm, the length from 0.2 to 5 mm, the depth from 0.2 to 5 mm and the curvature of the prism inclined surface from 0 to 1 $mm^{-1}$. The prism inclined surface may be planar, curved or faceted.

The reflective surface coating of the micro-prisms may be a metallic coating such as for example Aluminium, silver, gold, copper, or chromium. The coating has a thickness that may be varied from 1 nm to 1 micron to induce reflectivity variation.

According to a first preferred embodiment, the array of micro-prisms is receiving the input light beam with an angle of incidence inferior to 90 degree and the micro-prisms have an angle between inclined and vertical surfaces preferably between 15 to 35 degree, most preferably 22.5.

The input light beam according to the first embodiment may be provided by an optical fibre or an extended light source such as a tube lamp, a light bulb or a LED (Light Emitting Diode) in order to obtain a given output illumination intensity and uniformity.

Advantageously, the localisation of partially reflective micro-prisms inside a plate allows for a higher degree of control of the illumination outgoing the illumination plate and for a better distribution uniformity of the output light beam. The light that is not reflected by one micro-prism, is still guided by the plate without degradation and reflected by another micro-prism.

According to a second preferred embodiment, the array of micro-prisms is receiving the input light beam, with an angle of incidence between 40 and 50 degree and the micro-prisms have an angle between inclined and vertical surfaces preferably of 40 to 50 degree, most preferably of 45 degree.

The input light beam according to the second embodiment may be provided by a light source with low divergence and small section, in order to generate an output fan-out of beams. For example the light source is an optical fibre with a collimating lens, a laser diode with a collimating lens or a gas laser beam.

Every time the light is hitting one of the micro-prisms, it is partially reflected and is contributing to a beam splitting of the light. Light, which is not reflected by one micro-prism is still propagating towards next prisms without degradation of the beam properties.

Advantages of a fan-out generator according to the invention are its independence to wavelength, its compactness and its stiffness due to the localisation of partially reflective micro-prisms inside the plate. The compactness is perfectly fitting with feeding through an optical fibre or a laser diode with collimating lens.

The present invention provides in another of its aspects, the use of the device in order to obtain a uniform illumination. Such use is possible in commercial and residential market or automotive and aerospace industry. Exemplary residential and commercial uses include low profile interior or exterior lighting, back lighting devices such as personal computer, television, display device. Exemplary automotive applications include low profile car headlights and taillights, low profile interior car lights such as reading lights and map lights.

There is also provided in another aspect of the present invention, the use of the device in order to obtain a discrete beam-splitting distribution, Such use is possible in optical-communication market. Exemplary uses are optical inter-connector or optical switch.

Finally the present invention provides in another aspect, a process to manufacture the illumination device according to the invention characterised in that said process comprises etching and polishing a master mould into a micro-prisms master structure, copying the master into a copy with a micro-prisms structure, depositing a reflective coating on the micro-prisms structure of the copy, casting the resulting reflective micro-prisms structure.

In the process according to the invention, the master mould is generally made of metal. Etching and polishing the master mould, into a micro-prism master structure is generally carried out by precise mechanical machining. The resulting master depicts the wanted micro-prisms structure. In the micro-prism structure, each prism has a length between 0.2 and 5 mm, preferably 4 mm. The depth is generally equal to the length. The spacing between micro-prisms may be between 0.2 to 20 mm but is preferably inferior to 1 mm. The micro-prisms may touch each other.

In the process according to the invention, copying the master mould into a copy, is generally carried out by hot embossing under pressure or injection moulding of a plastic material. The plastic material may be a thermoplastic or a thermosetting synthetic resin as for example polyethylene terephtalate, polybutylene terephtalate, polycarbonate, polymethylmethacrylate, polyimide, polyacrylate, polyethersulfone, polyetherimide and cellulose triacetate resins. Preferably polymethylmethacrylate is used in the process of the present invention.

The reflective coating, according to the process of the invention is deposited on the prisms slopes only, generally by shadow deposition techniques. There may be employed Vacuum evaporation of metal with high reflective factor such as aluminium, silver, gold, copper or chromium. Vacuum evaporation of metal is performed by techniques such as radio frequency sputtering. Thickness of the coating may vary from 1 nm to 1 micron. Any variation in the coating thickness will be responsible of a variation in reflectivity.

The reflective micro-prisms structure obtained by the process according to the invention is then filled with the same plastic material by casting techniques such as UV casting or hot casting. Vacuum casting may also be used to reduce a risk of micro-bubbles formation inside the plate.

Alternatively and especially for deep micro-prisms of a few mm thickness, the casting technique may be replaced by the preparation of a further negative mould with the same plastic material and superimposed to the reflective micro-prisms structure, or positive mould obtained by the previous step of the process according to the invention. Both negative and positive moulds are then sealed together with an UV optical cement or thermosetting adhesives having a refractive index close to the index of the plate. Examples of adhesives are epoxies, polyurethanes, silicone elastomers. Contact is carefully made between both moulds to ensure index matching.

Advantageously the process according to the invention allows to the micro-prisms structure of the device to be self protected to environmental conditions.

BRIEF DESCRIPTION OF THE DRAWINGS

Other object and advantages of the present invention will become more clear in the following description. The description refers to the following figures.

DETAILED DESCRIPTION OF THE PREFERRED EMBODIMENTS

Figure 1:
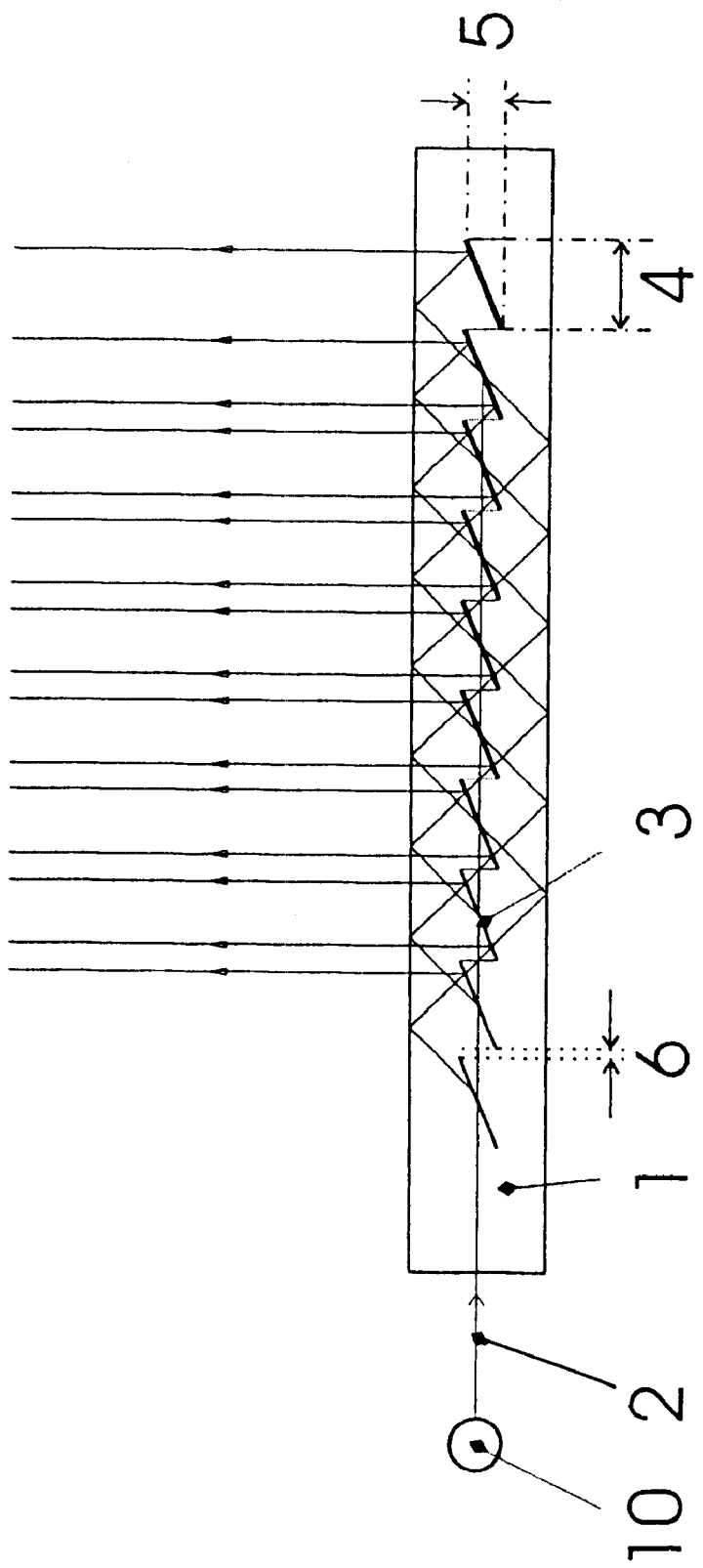
FIG. 1 is a 2-dimensions-view for an illumination device that is designed in accordance with the first preferred embodiment of the present invention. It represents a uniform illumination device with an edge input light beam.

According to the first preferred embodiment, FIG. 1 shows a schematic drawing of light transmission and reflection in a light plate 1 with an input light beam 2 at one edge of the plate. The input light beam 2 is provided by a tube lamp 10 emitting visible light. The tube lamp diameter at the input of the plate is slightly inferior to 4 mm and the light incident divergence is 45°.

The plate is made thin to perform total reflection inside the plate thickness. The thin plate is made out of a material with a refractive index close to the glass index of 1.5 allowing TLR to take place at a side wall of the plate (interface between plate and air) when light is hitting the wall with an incident angle larger than 42°. The plate is made of polymethylmethacrylate and has a refractive index of 1.49.

An array of 64 reflective micro-prisms 3 (not represented in FIG. 1, for clarity reason) is located inside the plate. The micro-prisms have a length 4 of 2 mm and a depth 5 of 1.65 mm. The triangular shape of the micro-prism with an inclined surface and a vertical surface shows a right-angled triangle on cross section and a slope angle of 22.5°. The micro-prisms are aligned with a spacing 6 inferior to 0.5 mm.

Micro-prisms physical characteristics have been calculated and light transmission and reflection simulated with a computer program based on reflection law, taking into account Fresnel reflection at each interface plastic/air of the plate. The computer program of ray-racing is commercialised by BRO under the trade name ASAP.

The ray tracing program has been used during 10 minutes on a PC with 133 MHz CPU. The ray-tracing of 225 incident rays has generated 15.000 rays by multiple partial reflection inside the plate. The reflectivity has been optimised until a uniform light distribution was retrieved.

Figure 2:
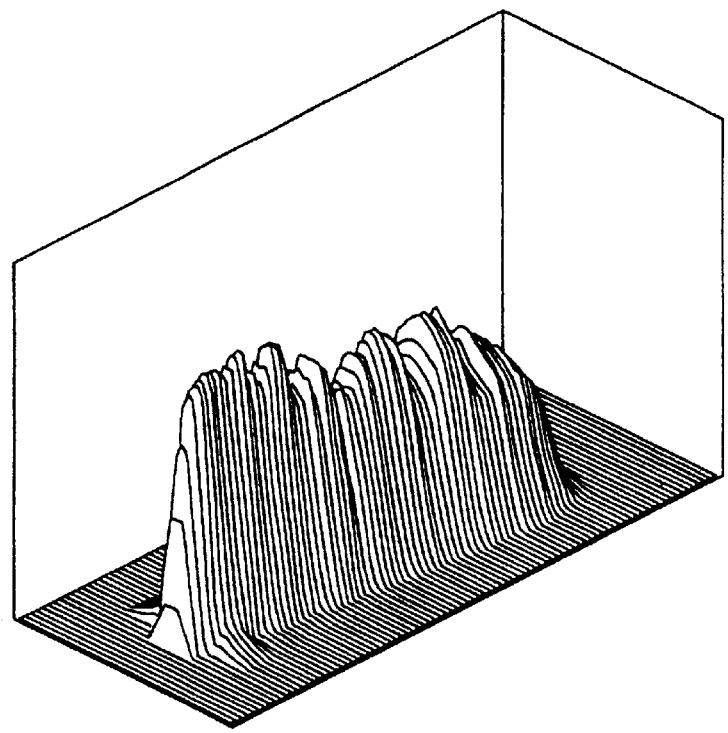
FIG. 2 shows the output light beam intensity distribution corresponding to the device of FIG. 1.

FIG. 2 shows the corresponding output light beam intensity distribution expressed in flux per unit area, that has been calculated via the ray-tracing program for the embodiment of FIG. 1.

The plate for uniform illumination of FIG. 1 is prepared according to the steps showed schematically in FIG. 5

Figure 5A:
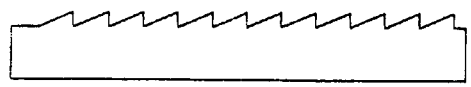
FIG. 5 is a schematic drawing showing the process to manufacture an illumination device according to the invention.

A master mould is etched and polished by precise mechanical machining (FIG. 5A). The resulting master depicts a wanted micro-prisms structure.

Figure 5B:
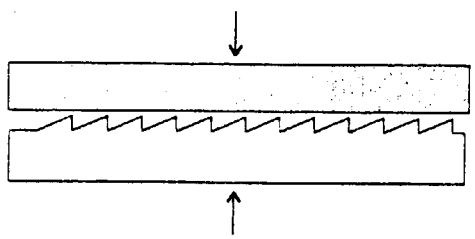
Figure 5C:
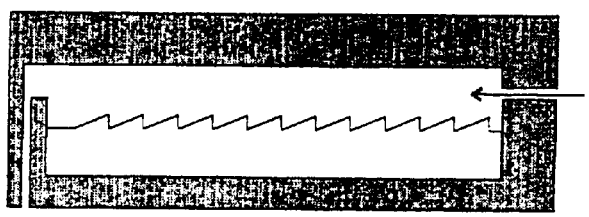

A polymethylmethacrylate copy is realised by hot embossing (FIG. 5B)

Figure 5D:
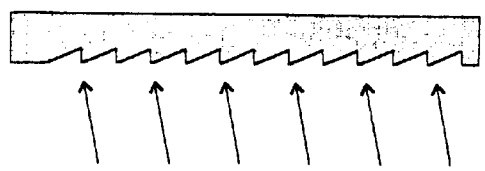

A reflective aluminium coating is deposited on the prisms slopes only, by shadow deposition techniques (FIG. 5D). Thickness of the coating is less than 1 micron for all micro-prisms but slightly increasing from the first to the last micro-prism.

Figure 5E:
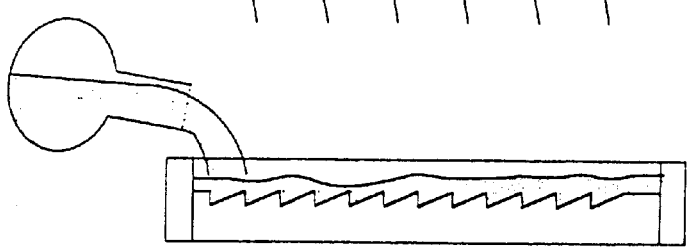

The reflective aluminium coated device obtained at the previous step is then filled with the same plastic material by hot casting technique (FIG. 5E).

The plate for uniform illumination has also been prepared as above by using injection moulding (5C) instead of hot embossing in the preparation of the polymethylmethacrylate copy.

Finally, the plate for uniform illumination has also been prepared, as above, but by replacing the casting technique, by the preparation of a second negative plastic copy (5F) to be superimposed to the first copy (5B). Both copies are sealed with an optical cement which performs the same refractive index as the plastic copies. The cement used is manufactured by 3M company, under the trade name Vitralit 1731.

Figure 5F:
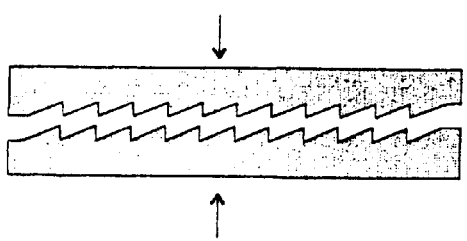
Figure 5G:
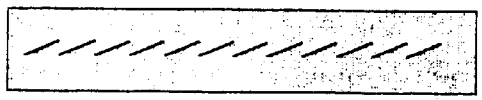

The final device comprises an array of partly reflective micro-prisms located inside the plate (FIG. 5G). The present illumination device is a compact and low-cost device.

Figure 3:
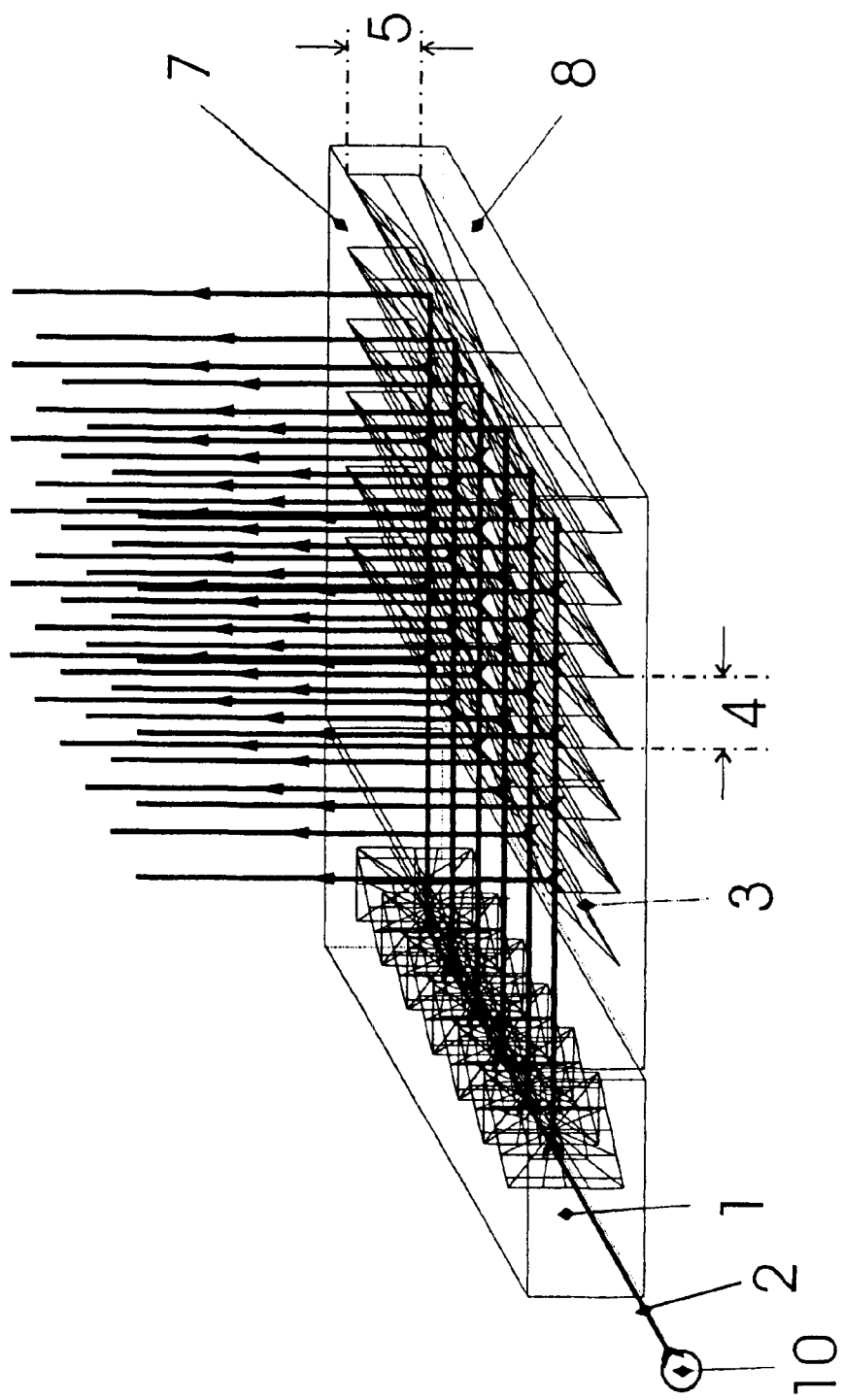
FIG. 3 is a 3-dimensions-view for an illumination device that is designed in accordance with the second preferred embodiment. It represents a fan-out generator.

According to the second preferred embodiment, FIG. 3 shows a schematic drawing of light transmission and reflection in a fan-out generator with an input light beam provided by a single light source 10 of 650 nm wavelength, with no divergence and a small section of 1.5 mm. The input light beam is injected into the plate by one edge. The fan-out generator is fully integrated inside a plate 1.

The plate 1 has a length of 140 mm, a width of 100 mm and a thickness of 6 mm. The plate is in polymetylmethacrylate and its refractive index is 1.49. An array of 6×6 partially-reflective flat micro-prisms 3 are located inside the plate. The micro-prisms are touching each other. No spacing 6 between micro-prisms is recorded.

The micro-prisms 3 have a length 4 of 4 mm, a depth 5 of 4 mm and an angle between inclined and vertical surface of 45°. The shape of the inclined surface is flat. The physical characteristics of the micro-prisms have been calculated and the light transmission and reflection simulated by the computer program ray-tracing. The ray tracing of 100 incident rays has generated 5000 rays by multiple reflection inside the plate thickness.

The input light beam injected by one edge is guided inside the plate 1 parallel to the front 7 and bottom 8 surfaces. Every time the input light beam is hitting one of the 6 micro-prisms from the array parallel to surface 7, with an incident angle of 45 degree, it is partially reflected and partially transmitted. Partial transmission occurs through the first 5 micro-prisms, whereas partial reflection occurs onto the inclined surface of the 6 micro-prisms. The partially reflected input light beam is then transmitted inside the plate and partly reflected again onto the micro-prisms of the array parallel to surface 8 providing the beam splitting of the input light beam.

Figure 4:
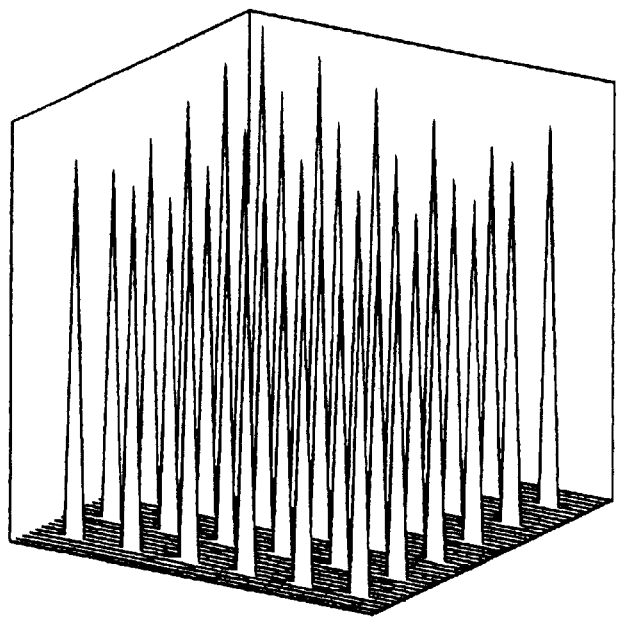
FIG. 4 shows the output light beam intensity distribution corresponding to the device of FIG. 3.

FIG. 4 shows the output light beam intensity distribution, expressed in flux per unit area, of the fan-out generator according to FIG. 3.

The two-dimensional fan-out generator is made of two one-dimensional fan-out generators combined together to act in cross plane of incidence. The one dimensional fan-out is prepared according to the following steps showed in FIG. 5:

- A master mould is etched and polished by precise mechanical machining (FIG 5A). The resulting master depicts the wanted micro-prisms structure
- A polymethylmethacrylate copy is realised by injection moulding (FIG. 5C).
- A reflective aluminium coating is deposited on the prism slopes only, by shadow deposition techniques (FIG. 5D). Vacuum evaporation of aluminium is performed by radio frequency sputtering. The coating has a thickness which is less than 1 micron for all micro-prisms but slightly increasing from the first to the last micro-prism according to a variation of reflectivity.

The aluminium coated device obtained at the previous step is filled with polymethylmethacrylate by hot casting technique (FIG. 5E).

The plate for the fan-out generator has also been prepared as above but replacing the casting technique by the preparation of a second negative plastic copy (5F) to be superimposed to the first copy and sealed with an optical cement which performs the same refractive index as both copies. The cement used, is manufactured by 3M company under the trade name Vitralit 1731.

The final device comprises 6×6 reflective micro-prisms located inside the plate (FIG. 5F).

The localisation of partially reflective micro-prisms inside a guiding plate allows for a very compact and robust fan-out generator. The compactness of the device is perfectly fitting with a feeding through an optical fibre or a laser diode with collimating lens.

Variation or changes in the invention may include the use of different micro-prisms composition, shape size, distance, reflectivity; as long as prisms are still located inside the plate.

What is claimed is:

1. An illumination device comprising a plate for guiding light there through, said plate having an input for receiving an input light beam injected into said plate and an array of N micro-prisms inside and encapsulated by said plate, each said array of N micro-prisms having an inclined reflective surface forming a homogenous medium around said array of N micro-prisms for receiving the input light beam and for producing an output light beam from said input light beam, the micro-prisms have a right angle triangle cross section and an angle between inclined and vertical surfaces between 15 to 35 degrees, and the array of micro-prisms receives the input light beam with an angle of incidence less than 90 degrees.

2. The illumination device according to claim 1, wherein the input light beam is injected into the plate through one edge.

3. The illumination device according to claim 1, wherein the input light beam is partly reflected by the device onto the array of N micro-prisms.

4. The illumination device according to claim 1, wherein the input light beam is partly transmitted through N−1 micro-prisms.

5. The illumination device according to claim 1, wherein the distance between two successive micro-prisms is inferior to 1 mm.

6. The illumination device according to claim 1, wherein the device cooperates with a light source for providing the input light beam.

7. The illumination device of claim 6, wherein the light source is an optical fibre, a tube lamp, a light bulb, or a light emitting diode.

8. The illumination device according to claim 7, further comprises a fan-out generator in cooperation with a light source having low divergence and small section for providing the input light beam.

9. The illumination device of claim 8, wherein the light source having low divergence and small section is an optical fibre with a collimating lens, a laser diode with a collimating lens, or a gas laser beam.

10. An illumination device comprising a plate for guiding light there through, said plate having an input for receiving an input light beam injected into said plate and an array of N micro-prisms inside and encapsulated by said plate, each said array of N micro-prisms having an inclined reflective surface forming a homogenous medium around said array of N micro-prisms for receiving the input light beam and for producing an output light beam from said input light beam, the micro-prisms have a right angle triangle cross section and an angle between inclined and vertical surfaces between 40 to 50 degrees, and the array of micro-prisms receiving the input light beam with an angle of incidence between 40 to 50 degrees.

11. An illumination device comprising a plate for guiding light there through, said plate having an input for receiving an input light beam injected into said plate and an array of N micro-prisms inside and encapsulated by said plate, each said array of N micro-prisms having an inclined reflective surface forming a homogenous medium around said array of N micro-prisms for receiving the input light beam and for producing an output light beam from said input light beam, the micro-prisms have a right angle triangle cross section and an angle between inclined and vertical surfaces between 40 to 50 degrees, and the array of N micro-prisms is in cross incidence with another array of N micro-prisms in the plate.

12. A process to manufacture an illumination device, the illumination device comprising a plate provided for guiding light there through, having an input for receiving an input light beam to be injected into said plate and an array of N micro-prisms provided for receiving the input light beam and producing an output light beam from said input light beam wherein the array of micro-prisms are located inside the plate, and said process comprises:

a) etching and polishing a master mould into a micro-prisms master structure, b) copying the master into a copy with a micro-prisms structure, c) depositing a reflective coating on the micro-prisms structure of the copy, and d) casting the resulting reflective micro-prisms structure.

13. The process according to claim 12, wherein the casting of the reflective micro-prisms is replaced by a superimposition of a second negative copy on the reflective micro-prisms structure, followed by a sealing with an optical cement or adhesive.

* * * * *